US008532704B2

(12) United States Patent
Ma et al.

(10) Patent No.: US 8,532,704 B2
(45) Date of Patent: Sep. 10, 2013

(54) TERMINAL OF SUPPORTING ENHANCED NEAR FIELD COMMUNICATION AND ITS PROCESSING METHOD (75) Inventors: Jingwang Ma, Shenzhen (CN); Qian Jia, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 109 days.

(21) Appl. No.: 13/201,269

(22) PCT Filed: Aug. 25, 2009

(86) PCT No.: PCT/CN2009/073505
§ 371 (c)(1),
(2), (4) Date: Aug. 12, 2011

(87) PCT Pub. No.: WO2010/096976
PCT Pub. Date: Sep. 2, 2010

(65) Prior Publication Data
US 2011/0312271 A1  Dec. 22, 2011

(30) Foreign Application Priority Data
Feb. 26, 2009  (CN) .......................... 2009 1 0078353

(51) Int. Cl.
*H04B 1/38* (2006.01)
*H04B 5/00* (2006.01)
*G06K 19/07* (2006.01)

(52) U.S. Cl.
CPC .......... *H04B 1/3816* (2013.01); *G06K 19/0723* (2013.01)
USPC ......... 455/557; 455/558; 455/41.1; 455/41.2; 455/574; 455/343.2

(58) Field of Classification Search
USPC ..................... 455/41.1, 41.2, 557, 558, 552.1, 455/553.1, 574, 343.1–343.5; 340/505, 539.3, 340/854.8
See application file for complete search history.

(56) References Cited

U.S. PATENT DOCUMENTS 7,047,051 B2 * 5/2006 Sackett et al. ................ 455/574
7,720,438 B2 * 5/2010 Rowse .......................... 455/41.1
(Continued)

FOREIGN PATENT DOCUMENTS

CN       101099303 A    1/2008
CN       101171604 A    4/2008
(Continued)

OTHER PUBLICATIONS

International Search Report for PCT/CN2009/073505 dated Nov. 4, 2009.
International Preliminary Report on Patentability and Written Opinion dated Aug. 30, 2011, PCT/CN2009/073505, English translation.

*Primary Examiner* — Duc M Nguyen
(74) *Attorney, Agent, or Firm* — Banner & Witcoff, Ltd.

(57) ABSTRACT

The present invention provides a terminal supporting eNFC and its processing method, in which a card emulation mode is disabled when a user card does not support SWP, and NFC in non card emulation modes can further be supported. A mobile terminal disabling/enabling the NFC function is implemented by the interaction of the mobile terminal with a NFC emulation front end chip therein. When the terminal determines that the user card does not support the SWP interface, it disables the NFC function. If the terminal is required to work in a non card emulation mode, the terminal starts a NFC application in the non card emulation, mode, and enables the NFC function when determining that the NFC function is in a disabled state; after the NFC ends, the terminal disables the NFC function when determining that the user card does not support the SWP interface.

24 Claims, 3 Drawing Sheets (56) References Cited

U.S. PATENT DOCUMENTS

| | | | |
|---|---|---|---|
| 7,991,434 B2* | 8/2011 | Yen et al. | 455/558 |
| 8,077,645 B2* | 12/2011 | Fukami et al. | 370/310 |
| 2006/0079180 A1 | 4/2006 | Sinivaara | |
| 2007/0123305 A1* | 5/2007 | Chen et al. | 455/558 |
| 2007/0297356 A1* | 12/2007 | Rofougaran | 370/328 |
| 2009/0098825 A1 | 4/2009 | Huomo et al. | |
| 2009/0291634 A1* | 11/2009 | Saarisalo | 455/41.1 |
| 2010/0082444 A1* | 4/2010 | Lin et al. | 705/17 |
| 2010/0090805 A1* | 4/2010 | Libotte | 340/10.2 |
| 2010/0210300 A1* | 8/2010 | Rizzo et al. | 455/552.1 |
| 2012/0021683 A1* | 1/2012 | Ma et al. | 455/41.1 |

FOREIGN PATENT DOCUMENTS

| | | | |
|---|---|---|---|
| CN | 101393666 A | | 3/2009 |
| EP | 2048591 | * | 4/2009 |
| JP | 2003318763 A | | 11/2003 |
| JP | 2005252386 A | | 9/2005 |
| JP | 2005293516 A | | 10/2005 |
| JP | 2006067448 A | | 3/2006 |
| JP | 2009534771 A | | 9/2009 |
| JP | 2010506431 A | | 2/2010 |
| WO | 2007113729 A1 | | 10/2007 |
| WO | 2007122439 A1 | | 11/2007 |
| WO | WO2008/065232 A1 | | 6/2008 |

* cited by examiner

TERMINAL OF SUPPORTING ENHANCED NEAR FIELD COMMUNICATION AND ITS PROCESSING METHOD

TECHNICAL FIELD

The present invention relates to the enhanced Near Field Communication (eNFC) technique, and particularly, to a terminal supporting eNFC and a processing method thereof.

BACKGROUND OF THE INVENTION

The Integrated Circuit (IC) card, especially the contactless IC card, after over ten years' development, has been widely applied in fields such as public transport, entrance guard, and petty electronic payment etc. At the meantime, the mobile terminal has been popularized among residents after rapid development of over twenty years, and offers great convenience for people's work and life. The mobile terminal has more and more powerful functions, and has a tendency to incorporate more functions. The combination of the mobile terminal with the contactless IC card technique enables the mobile terminal to be applied in the electronic payment field, which will further extend the application scope of the mobile terminal and offer more convenience for people's life, and has a vast application prospect.

At present, the eNFC is a mainstream mobile payment solution in China, and obtains supports of operators and related terminal manufactures. The eNFC technique is an enhancement and improvement of the Near Field Communication (NFC) technique. It is a short distance wireless communication technique working at 13.56 MHz, and is evolved from the convergence of the Radio Frequency Identification (RFID) technique and interconnection technique. After applying the eNFC technique, the mobile terminal can emulate a contactless IC card for use in applications related to electronic payment.

To apply the eNFC technique on a mobile terminal, it is required to add a NFC emulation front end chip, Contactless Front-end (CLF), and a NFC antenna on the mobile terminal, and further to use a mobile user card supporting the Single Wire Protocol (SWP), which can be a Subscriber Identity Module (SIM) card, a User Identity Module (UIM) card, or a User Service Identity Module (USIM) card etc. The RFID protocols supported by the NFC emulation front end chip include ISO 14443 Type A/Type B, Felica, and ISO15693 etc.

The NFC emulation front end chip can communicate with the main processor of the mobile terminal through a Universal Asynchronous Receiver/Transmitter (UART) interface; the NFC emulation front end chip connects with the C6 pin of the mobile user card through a signal line, and communicates with the application part in the mobile user card by using the SWP; the mobile user card connects with the main processor chip of the mobile terminal through an ISO7816 interface, and this connection uses the Reset, CLK, and IO pins of the mobile user card, which can correspond to the C2, C3 and C7 pins respectively.

The feature of the eNFC is that the application related to electronic payment is stored in the mobile user card and the storage and execution of the electronic payment is carried out by the mobile user card. Besides, the VCC, namely the C1, pin of the mobile user card is connected with the NFC emulation front end chip so that the eNFC technique is able to support the terminal power down mode. In this mode, the NFC emulation front end chip and the mobile user card obtain energy from an electromagnetic field generated by an external contactless card reader via the NFC antenna, and thus can also work in a card emulation mode when the mobile terminal is power off, and interact with the external contactless card reader to complete the electronic payment.

After applying the eNFC technique, the mobile terminal can support three different working modes according to different application scenarios, which are respectively a card emulation mode, a card reader mode and a point to point mode. In the card emulation mode, the contactless card reader acts as an active device and generates an electromagnetic field, and the mobile terminal acts as a passive device, emulates a contactless card, and interacts with the contactless card reader. In the card reader mode, the mobile terminal acts as an active device and emulates a contactless card reader to generate an electromagnetic field, and the contactless IC card acts as a passive device and interacts with the mobile terminal, wherein the mobile terminal has functions of a contactless IC card reader complying with the ISO14443, or ISO15693, or Felica standard, and is able to read an external contactless IC card using the same standard. In the point to point mode, either of two working mobile terminals can act as an active device or passive device respectively to carry out point to point data transmission.

The default working mode of the mobile terminal is the card emulation mode, in which the radio frequency of the NFC emulation front end chip is in the working state, and when the mobile terminal enters into the working area of a contactless card reader, the mobile terminal can detect the signal transmitted by the contactless card reader, and set up communication with the contactless card reader. Besides, when the mobile terminal is power on, the NFC emulation front end chip uses the power provided by the mobile terminal to interact with the contactless card reader.

If the contactless card reader application on the mobile terminal is run, the contactless card reader application can make the NFC emulation front end chip work in the card reader mode by relative instructions, and after the contactless card reader application ends, the NFC emulation front end chip returns to the card emulation mode. If the point to point communication application on the mobile terminal is run, the point to point communication application can make the NFC emulation front end chip work in the point to point mode by relative instructions, and after the point to point communication application ends, the NFC emulation front end chip returns to the card emulation mode. Therefore, after the mobile terminal is powered on, the NFC emulation front end chip is in the card emulation mode in most of the time.

In order to implement contactless electronic payment in the card emulation mode, the mobile user card is required to support the SWP, and the mobile user card communicates and connects with the NFC emulation front end chip in the physical layer and the data layer by using the SWP, of which the specific implementation can be seen in related existing technical schemes. The mobile user card and the NFC emulation front end chip interact in the logical control layer by using the Host Controller Interface (HCI) protocol, which specifies the interaction process of the mobile user card and NFC emulation front end chip when implementing the contactless electronic payment in the card emulation mode, and the specific implementation can be seen in related existing technical schemes.

It can be seen from the above description that the mobile user card is required to support the SWP so as to implement the contactless electronic payment in the card emulation mode. If the mobile user card employed in the mobile terminal does not support the SWP, the mobile terminal is unable to emulate a contactless card; however, the NFC emulation front end chip in the mobile terminal is still working in the card emulation mode. As the radio frequency of the NFC emulation front end chip is in the enabled state, it will consume the power of the mobile terminal. Besides, when the mobile terminal enters into the working area of a contactless card reader, the NFC emulation front end chip will still respond to the signal transmitted by the contactless card reader, and execute the process relating to setting up communication; but if the mobile user card does not support the SWP, it is unnecessary to respond to the signal of the contactless card reader at all, and thus such response of the NFC emulation front end chip to the signal of the contactless card reader causes a waste of resources.

SUMMARY OF THE INVENTION

In view of the above, one object of the present invention is to provide a terminal supporting the eNFC and its processing method, which can effectively save resources when the user card does not support the SWP, and can further support non card emulation modes.

Another object of the present invention is to provide a terminal supporting the eNFC and its processing method, which can support non card emulation modes on the premise of effectively saving resources when the user card does not support the SWP.

In order to achieve the above objects, the technical schemes of the present invention are realized as follows.

A processing method in a terminal supporting eNFC, comprising: when the terminal determines that a user card does not support a Single Wire Protocol (SWP) interface, disabling a Near Field Communication (NFC) function.

The terminal determines that the user card does not support the SWP interface through interface support information provided by the user card or a stored SWP interface flag.

The step of disabling the NFC function is implemented by disabling a NFC emulation front end chip.

Before the step of disabling the NFC function, the method further comprises: the terminal inquiring a current state of the NFC function.

Before the step of disabling the NFC function, the method further comprises: the terminal determining that a user confirms the disabling through a human machine interaction interface; and/or after the step of disabling the NFC function, the method further comprises: the terminal displaying a current state of the NFC function to the user in a form of text or icon on a screen.

After disabling the NFC function, the method further comprises: when the terminal starts a NFC application in a non card emulation mode and determines that the NFC function is in a disabled state, enabling the NFC function, and the terminal switching to a corresponding working mode according to the non card emulation mode and carrying out the NFC.

After the NFC ends, the method further comprises: disabling the NFC function.

A processing method in a terminal supporting eNFC, used for the terminal with a disabled NFC function, the method comprising: when the terminal is required to start a NFC application in a non card emulation mode and determines that the NFC function is in a disabled state, enabling the NFC function.

Before the terminal starts the NFC application in the non card emulation mode, the method further comprises: the terminal determining whether a user card supports a SWP interface; further, the terminal determines whether the user card supports the SWP interface through interface support information provided by the user card or a stored SWP interface flag.

The step of enabling the NFC function is implemented by enabling a NFC emulation front end chip.

Before the step of enabling the NFC function, the method further comprises: the terminal inquiring a current state of the NFC function.

Before the step of enabling the NFC function, the method further comprises: the terminal determining that a user confirms the enabling through a human machine interaction interface; and/or after the step of enabling the NFC function, the method further comprises: the terminal displaying a current state of the NFC function to the user in a form of text or icon on a screen.

After enabling the NFC function, the method further comprises: the terminal switching to a corresponding working state according to the non card emulation mode, and carrying out the NFC.

After the NFC ends, the method further comprises: when the terminal determines that a user card does not support a SWP interface, disabling the NFC function.

A terminal supporting eNFC, comprising a NFC control unit and a NFC emulation front end chip, wherein the NFC control unit is configured to instruct the NFC emulation front end chip to be disabled when determining that a user card does not support a SWP interface; the NFC emulation front end chip is configured to disable a NFC function according to the instruction of the NFC control unit.

The NFC control unit is further configured to send a NFC state inquiry instruction to the NFC emulation front end chip; the NFC emulation front end chip is further configured to return a current working state thereof to the NFC control unit according to the NFC state inquiry instruction.

When a NFC application in a non card emulation mode is run, the NFC control unit is configured to instruct the NFC emulation front end chip to be enabled when determining that the NFC emulation front end chip is in a disabled state; the NFC emulation front end chip is configured to enable the NFC function according to the instruction of the NFC control unit.

A terminal supporting eNFC, comprising a NFC control unit and a NFC emulation front end chip, wherein the terminal is configured such that when the NFC emulation front end chip disables a NFC function and runs a NFC application a non card emulation mode, the NFC control unit instructs the NFC emulation front end chip to be enabled when determining that the NFC emulation front end chip is in a disabled state; the NFC emulation front end chip enables the NFC function according to the instruction of the NFC control unit.

The NFC control unit is further configured to send a NFC state inquiry instruction to the NFC emulation front end chip; the NFC emulation front end chip is further configured to return a current working state thereof to the NFC control unit according to the NFC state inquiry instruction.

According to the scheme provided in the present invention, the terminal judges whether the user card supports the contactless electronic payment in the card emulation mode by detecting whether the user card supports the SWP interface; when the user card does not support the contactless electronic payment in the card emulation mode, the mobile terminal can instruct the NFC emulation front end chip to disable the NFC function so that the NFC emulation front end chip neither responds to the radio frequency signal of an external contactless card reader nor transmits a radio frequency signal, which can reduce power consumption of the terminal and extend the stand-by time of the terminal.

Besides, the present invention also provides a corresponding scheme, in which the Near Field Communication in a non card emulation mode can be supported even after the NFC emulation front end chip disables the NFC function, and the NFC function of the NFC emulation front end chip is still disabled after the Near Field Communication in the non card emulation mode is completed, thereby keeping the low power consumption of the terminal.

PREFERRED EMBODIMENTS OF THE PRESENT INVENTION

If the user card does not support the SWP, it means that the user card does not support the contactless electronic payment in the card emulation mode, then the terminal cannot emulate a contactless card, and even if the terminal enters into the working area of a contactless card reader, the NFC emulation front end chip does not need to set up communication with the contactless card reader. Therefore, if the user card does not support the SWP, the functions related to contactless electronic payment on the terminal should be forbidden to use.

In the present invention, the terminal judges whether the user card supports the SWP interface, and disables the NFC function when determining that the user card does not support the SWP interface. The terminal can judge whether the user card supports the SWP interface according to the interface support information provided by the user card; or can judge whether the user card supports the SWP interface according to a stored SWP interface flag. Preferably, the terminal can execute the judgment of whether the user card supports the SWP interface when it is powered on. The terminal disables the NFC function by disabling the NFC emulation front end chip. The terminal can further inquire the current state of the NFC function before disabling the NFC function, and disables the NFC function when determining that the NFC function is in the enabled state.

The NFC function being in the disabled state means that even if the terminal enters into the working area of a contactless card reader, the NFC emulation front end chip will not respond to the signal transmitted by the contactless card reader or execute the process relating to setting up communication. The NFC function being in the enabled state means that when the terminal enters into the working area of a contactless reader, the NFC emulation front end chip will respond to the signal transmitted by the contactless card reader and execute the process relating to setting up communication.

Since after the NFC function is disabled, the radio frequency of the NFC emulation front end chip is in the disabled state and will no more respond to the signal transmitted by an external contactless reader-writer, it will not work in the card reader mode or point to point mode to transmit a radio frequency signal either. Thus after the NFC function is disabled, when the terminal is required to work in a non card emulation mode such as the card reader mode or point to point mode, then the Near Field Communication application in the card reader mode or point to point mode is run on the terminal, and if the terminal determines that the NFC function is in the disabled state, it enables the NFC function, the terminal enables the NFC function by enabling the NFC emulation front end chip, and then the terminal switches the NFC emulation front end chip to the corresponding working mode according to requirements of the non card emulation mode such as the card reader mode or point to point mode, and the terminal together with the NFC emulation front end chip carry out the Near Field Communication. Furthermore, after the Near Field Communication payment ends, the terminal can disable the NFC function and return to the previous disabled state. Before enabling the NFC function, the terminal can further inquire the current state of the NFC function, and enables the NFC function when determining that the NFC function is in the disabled state.

Taking the mobile terminal as an example, specific implementation of the present invention will be described in detail below, wherein the mobile terminal disabling/enabling the NFC function is realized by the interaction of the mobile terminal with the NFC emulation front end chip within it.

In the eNFC scheme, the mobile user card stores the electronic payment application, and the mobile user card provides a secure and open application running environment. The mobile user card can be a SIM card, a UIM card, or a USIM card etc., and the USIM card is taken as an example in the following description. When the mobile user card is a SIM card or UIM card, the scheme used in the following description can be used similarly.

The mobile terminal communicates with the USIM card by using the existing ISO7816 interface. The main processor of the mobile terminal communicates with the NFC emulation front end chip by using the UART interface, and the main processor of the mobile terminal controls the functions of the NFC emulation front end chip through this interface. The communication protocol between the main processor of the mobile terminal and the NFC emulation front end chip can be the HCI protocol.

When the mobile terminal implements the contactless electronic payment in the card emulation mode by using the eNFC technique, the USIM card communicates with the NFC emulation front end chip in the mobile terminal through the SWP interface. If the USIM card does not support the SWP interface, it means that the USIM card does not support the contactless electronic payment in the card emulation mode using the eNFC technique. Therefore, judging whether the USIM card supports the SWP interface is actually judging whether the USIM card supports the contactless electronic payment in the card emulation mode. Because a mobile terminal supporting the eNFC technique implementing the card emulation requires that the USIM card supports the SWP interface, when the USIM card does not support the SWP interface, the mobile terminal is unable to implement the contactless electronic payment in the card emulation mode.

Figure 1:
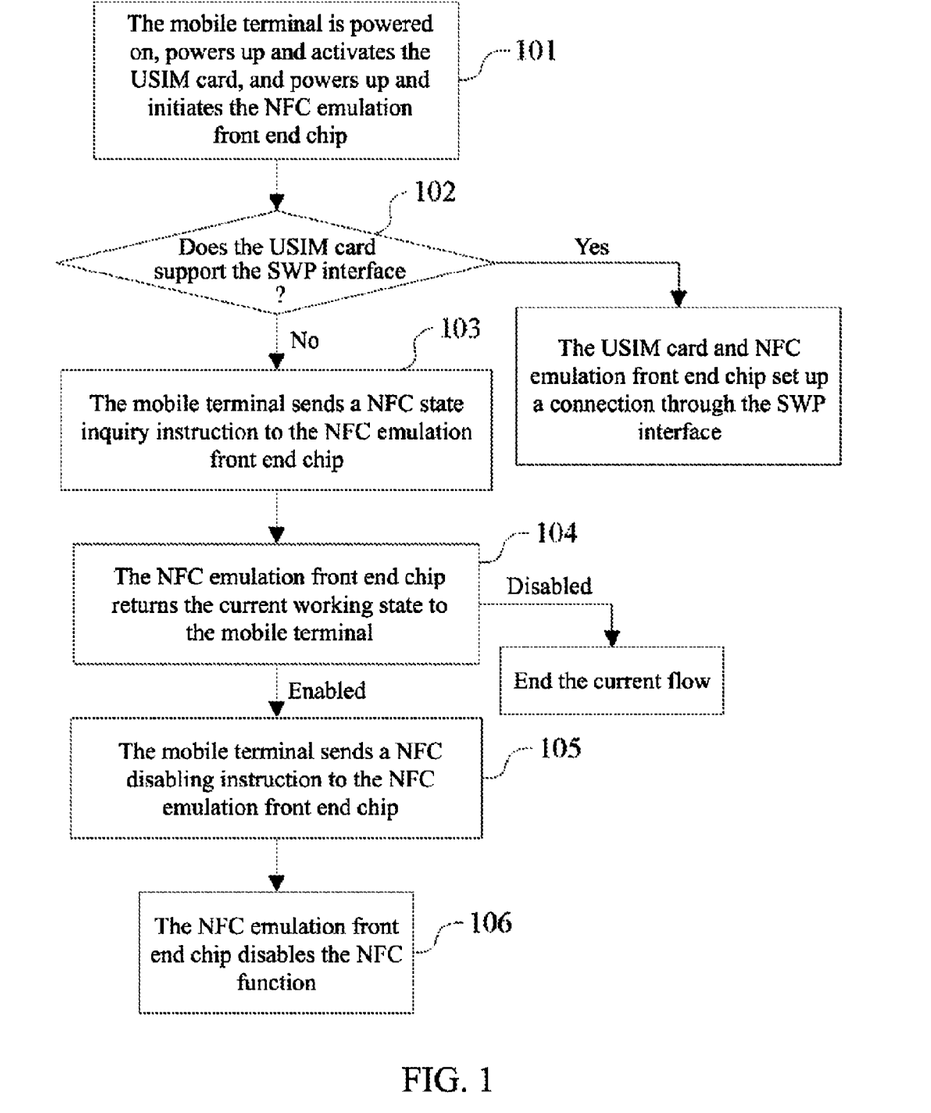
FIG. 1 is a flow chart of the processing in the mobile terminal according to the present invention.

FIG. 1 is a flow chart of the processing in the mobile terminal according to the present invention, and as shown in FIG. 1, the specific processing in the mobile terminal includes the following steps:

Step 101: the mobile terminal is powered on, powers up and activates the USIM card, and powers up and initiates the NFC emulation front end chip.

The mobile terminal is powered on, and the USIM card executes the Reset operation after being powered up. After the reset, the USIM card sends an Answer To Reset (ATR) message to the mobile terminal, and the USIM card provides information such as own characteristic parameters and supported interfaces of the USIM card etc. to the mobile terminal by the ATR message. The format of the ATR message complies with the definition in the ISO/IEC 7816-3[11] specification, and the Global Interface Bytes in the ATR message is used to identify the interfaces supported by the USIM card.

At present, the "6.3.3 Answer To Reset content" portion in the ETSI TS 102 221V8.0 Smart Cards; UICC-Terminal interface; Physical and logical characteristics specification defines the encoding format of the Global Interface Bytes. The $TB_i$ (i>2) in the Global Interface Bytes is used to identify the interfaces supported by the USIM card. If values of the b8 and b6 of the $TB_i$ are both 1, it indicates that the USIM card supports the SWP interface; while if the value of the b6 of the $TB_i$ is 0 or the ATR message does not include the Global Interface Bytes, it indicates that the USIM card does not support the SWP interface, that is, the USIM card does not support the contactless electronic payment in the card emulation mode applying the eNFC scheme.

Step 102: the mobile terminal judges whether the USIM card supports the SWP interface; if the USIM card supports the SWP interface, the USIM card and the NFC emulation front end chip set up a connection through the SWP interface according to the SWP specification, afterwards, the radio frequency of the NFC emulation front end chip is enabled, and the mobile terminal can work in the card emulation mode; if the USIM card does support the SWP interface, then step 103 is continuously executed.

The mobile terminal judges whether the USIM card supports the SWP interface by analyzing the ATR message from the USIM card: the mobile terminal analyzes whether the ATR message includes the Global Interface Bytes first, and if the ATR message does not include the Global Interface Bytes, it determines that the USIM card does not support the SWP interface; if the ATR message includes the Global Interface Bytes, it further analyzes whether the values of the b8 and b6 in the TBi of the Global Interface Bytes are both 1, and if the values are both 1, it determines that the USIM card supports the SWP interface, while if the values are not both 1, it determines that the USIM card does not support the SWP interface.

In order that the mobile terminal can record whether the USIM card supports the SWP interface, a SWP interface flag bit can be configured in the mobile terminal Name of this SWP interface flag bit can be configured as b_USIM_support_SWP, and certainly, it can be configured as other names as desired. It can be configured that the SWP interface flag bit being 1 indicates that the USIM card supports the SWP interface, and the SWP interface flag bit being 0 indicates that the USIM card does not support the SWP interface. The mobile terminal also can judge whether the USIM card supports the SWP interface by the SWP interface flag bit.

Steps 103~106: after the start-up of the NFC emulation front end chip is completed, the mobile terminal sends a NFC state inquiry instruction to the NFC emulation front end chip, and through this NFC state inquiry instruction and subsequent processing steps, the mobile terminal is able to acquire whether the current working state of the NFC emulation front end chip is enabled or disabled. After receiving the NFC state inquiry instruction, the NFC emulation front end chip returns the current working state of itself to the mobile terminal, and if the current working state of the NFC emulation front end chip is enabled, then the mobile terminal sends a NFC disabling instruction to the NFC emulation front end chip, and after receiving the NFC disabling instruction, the NFC emulation front end chip disables the NFC function, namely disabling the radio frequency of the NFC emulation front end chip; if the current working state of the NFC emulation front end chip is disabled, then the current flow is ended. After disabling the NFC function, the NFC emulation front end chip can further instruct the mobile terminal of the execution result.

After the NFC emulation front end chip disables the NFC function, the mobile terminal no more respond to the radio frequency signal of an external contactless reader-writer, or act as a contactless reader-writer to transmit a radio frequency signal outwards.

After the NFC emulation front end chip disables the NFC function, when the mobile terminal is required to work in a non card emulation mode such as the card reader mode or the point to point mode, and at this time, if the Near Field Communication application in the card reader mode or the point to point mode is needed to run on the mobile terminal, the current working state of the NFC emulation front end chip can be judged first, and when it is determined that the NFC emulation front end chip is in the disabled state, the mobile terminal instructs the NFC emulation front end chip to be enabled, and the NFC emulation front end chip enables the NFC function according to the instruction of the terminal, and then the mobile terminal switches the NFC emulation front end chip to the corresponding working mode according to requirements of the non card emulation mode such as the card reader mode or the point to point mode. After the Near Field Communication ends, the terminal can instruct the NFC emulation front end chip to be disabled, and the NFC emulation front end chip returns to the previous disabled state according to the instruction of the terminal.

Figure 2:
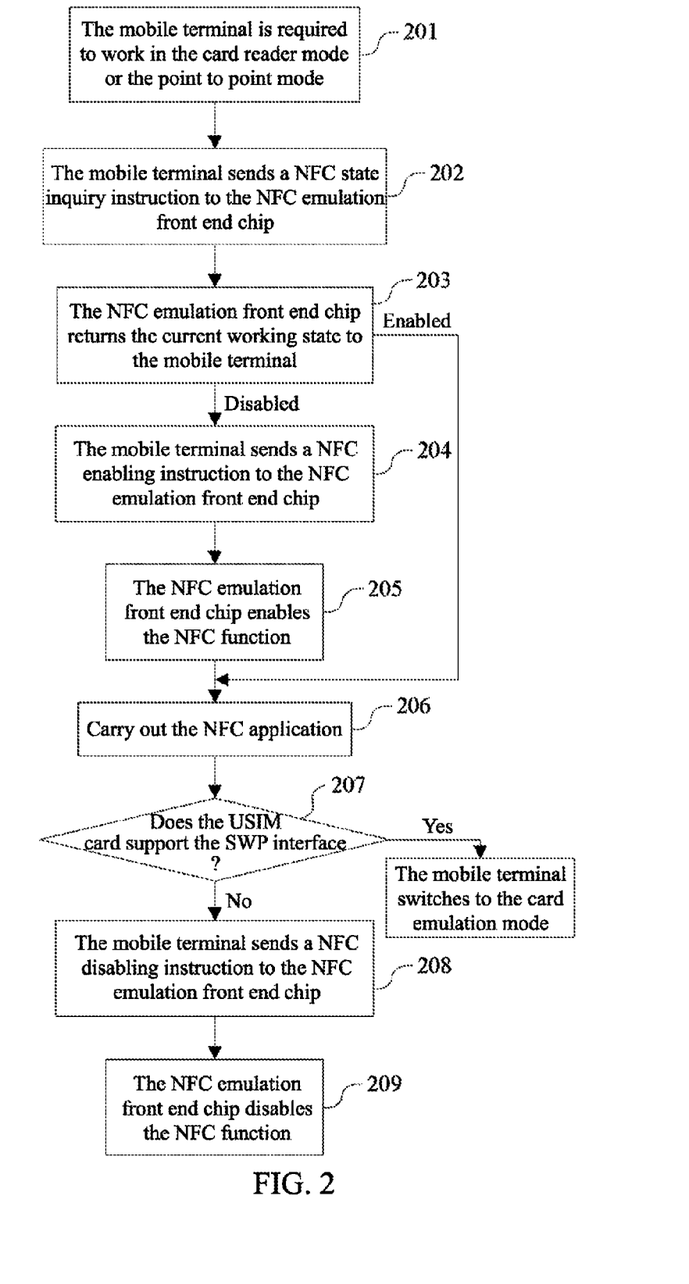
FIG. 2 is a flow chart of the processing in the mobile terminal after the NFC emulation front end chip is disabled according to the present invention.

FIG. 2 is a flow chart of the processing in the mobile terminal after the NFC emulation front end chip is disabled according to the present invention, and as shown in FIG. 2, after the NFC emulation front end chip is disabled, the specific processing in the mobile terminal includes the following steps:

Step 201: when the mobile terminal is required to work in the card reader mode or the point to point mode, the Near Filed Communication application in the card reader mode or the point to point mode is run on the mobile terminal.

Besides, before the step 201, the mobile terminal can judge whether the USIM card supports the SWP interface first, and if the USIM card supports the SWP interface, the step 201 is executed; if the USIM card does not support the SWP interface, the current flow is ended directly. The mobile terminal can judge whether the USIM card supports the SWP interface according to the stored SWP interface flag bit.

Steps 202~206: the mobile terminal sends a NFC state inquiry instruction to the NFC emulation front end chip, and through this NFC state inquiry instruction and subsequent processing steps, the mobile terminal is able to acquire whether the current working state of the NFC emulation front end chip is enabled or disabled. After receiving the NFC state inquiry instruction, the NFC emulation front end chip returns the current working state of itself to the mobile terminal, and if the current working state of the NFC emulation front end chip is enabled, then the mobile terminal together with the NFC emulation front end chip carry out the Near Field Communication in the card reader mode or the point to point mode; if the current working state of the NFC emulation front end chip is disabled, then the mobile terminal sends a NFC enabling instruction to the NFC emulation front end chip, and after receiving the NFC enabling instruction, the NFC emulation front end chip enables the NFC function, namely enabling the radio frequency of the NFC emulation front end chip, and then the mobile terminal switches the NFC emulation front end chip to the corresponding working mode according to the requirement of the non card emulation mode such as the card reader mode or the point to point mode to carry out the Near Field Communication in the card reader mode or the point to point mode together with the mobile terminal. After enabling the NFC function, the NFC emulation front end chip can further instruct the mobile terminal of the execution result.

Steps 207~209: after completing the Near Field Communication, the mobile terminal judges whether the USIM card supports the SWP interface, and if the USIM card supports the SWP interface, the mobile terminal can switch to the card emulation mode; if the USIM card does not support the SWP interface, the mobile terminal sends a NFC disabling instruction to the NFC emulation front end chip, and after receiving the NFC disabling instruction, the NFC emulation front end chip disables the NFC function, namely disabling the radio frequency of the NFC emulation front end chip, thereby implementing still disabling the NFC function of the NFC emulation front end chip after the Near Field Communication in the card reader mode or the point to point mode ends. The mobile terminal can judge whether the USIM card supports the SWP interface according to the stored SWP interface flag bit.

Besides, other than automatically indicating the disabling/enabling of the NFC emulation front end chip, before indicating the disabling/enabling of the NFC emulation front end chip, the mobile terminal can provide a human machine interaction interface on the screen of the mobile terminal for the user to conform whether to disable/enable the NFC emulation front end chip, and after the user confirms the enabling/disabling with the human machine interaction interface, the mobile terminal then instructs the NFC emulation front end chip to be disabled/enabled. For example, before the NFC emulation front end chip is disabled/enabled, a prompt window is displayed on the screen of the mobile terminal, and the prompting window displays prompt information of "the user card does not support electronic payment, whether to disable the Near Field Communication function".

Besides, in the present invention, a human machine interaction interface for setting the enabling/disabling of the Near Field Communication function of the mobile terminal can further be provided. The human machine interaction interface can adopt the form of a setting menu, so that the user can select enabling/disabling of the NFC emulation front end chip; when the NFC emulation front end chip is in the enabled state, only the NFC disabling menu can be selected, and after the user selects this menu, the mobile terminal sends a NFC disabling instruction to the NFC emulation front end chip to instruct the NFC emulation front end chip to be disabled; when the NFC emulation front end chip is in the disabled state, only the NFC enabling menu can be selected, and after the user selects this menu, the mobile terminal sends a NFC enabling instruction to the NFC emulation front end chip to instruct the NFC emulation front end chip to be enabled.

Moreover, after determining the current working state of the NFC emulation front end chip, the mobile terminal can further display to the user the current working state of the NFC emulation front end chip in the form of text or icon on the screen, so that the user is able to clearly know the current working state of the NFC emulation front end chip.

Figure 3:
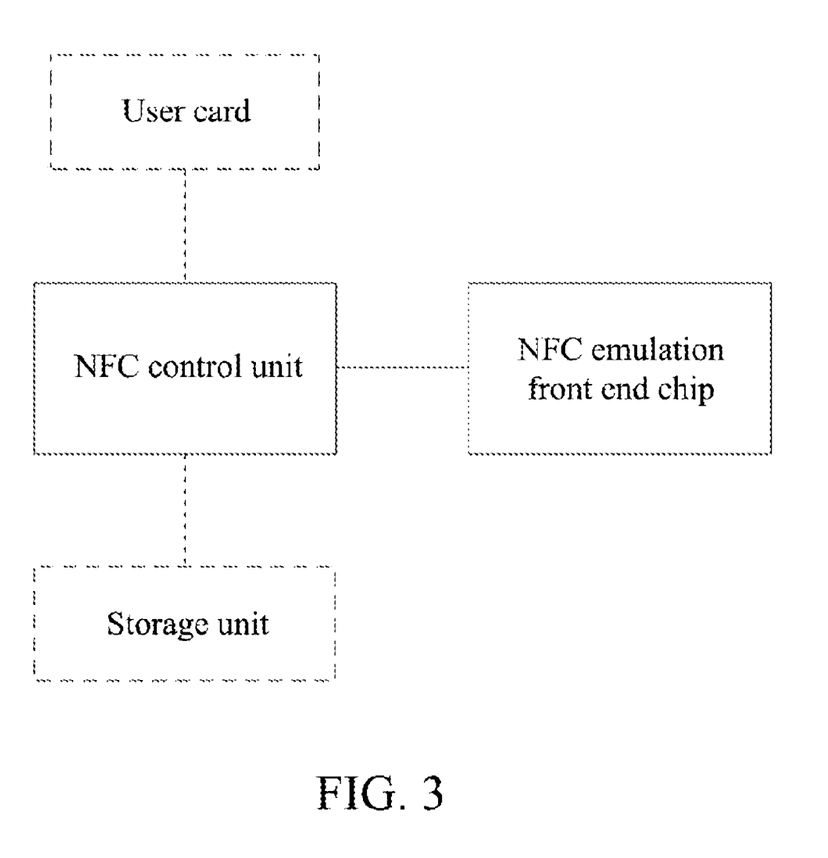
FIG. 3 is a schematic diagram of the structure of the terminal supporting eNFC according to the present invention.

FIG. 3 is a schematic diagram of the structure of the terminal supporting eNFC according to the present invention, and as shown in FIG. 3, the terminal includes a NFC control unit and a NFC emulation front end chip, wherein the NFC control unit is configured to instruct the NFC emulation front end chip to be disabled when it is determined that the user card does not support the SWP interface; and the NFC emulation front end chip disables the NFC function according to the instruction of the NFC control unit.

The NFC control unit is further configured to send a NFC state inquiry instruction to the NFC emulation front end chip; and the NFC emulation front end chip is further configured to return the current working state of itself to the NFC control unit according to the received NFC state inquiry instruction.

When the Near Field Communication in a non card emulation mode is run, the NFC control unit is configured to instruct the NFC emulation front end chip to be enabled when it is determined that the NFC emulation front end chip is in the disabled state; and the NFC emulation front end chip is configured to enable the NFC function according to the instruction of the NFC control unit.

The NFC emulation front end chip is further configured to return an execution result to the NFC control unit.

The NFC control unit is further configured to provide the current working state of the NFC emulation front end chip to the screen of the mobile terminal for display.

The NFC control unit is further configured to determine whether to send a NFC disabling/enabling instruction to the NFC emulation front end chip according to an input from a human machine interaction interface.

The NFC control unit is configured to judge whether the user card supports the SWP interface according to the interface support information provided by the user card; or the NFC control unit is configured to judge whether the user card supports the SWP interface according to a SWP interface flag stored in a storage unit.

What is described above is just preferred embodiments of the present invention and is not intended to limit the protection scope of the present invention.

INDUSTRIAL APPLICABILITY

According to the scheme provided in the present invention, the terminal judges whether the user card supports the contactless electronic payment in the card emulation mode by detecting whether the user card supports the SWP interface; when the user card does not support the contactless electronic payment in the card emulation mode, the mobile terminal can instruct the NFC emulation front end chip to disable the NFC function so that the NFC emulation front end chip neither responds to the radio frequency signal of an external contactless card reader nor transmits a radio frequency signal, which can reduce power consumption of the terminal and extend the stand-by time of the terminal.

Besides, the present invention also provides a corresponding scheme, in which the Near Field Communication in a non card emulation mode can be supported even after the NFC emulation front end chip disables the NFC function, and the NFC function of the NFC emulation front end chip is still disabled after the Near Field Communication in the non card emulation mode is completed, thereby keeping the low power consumption of the terminal.

What is claimed is:

1. A processing method in a terminal supporting enhanced Near Field Communication (eNFC), comprising:
   when the terminal determines that a user card does not support a Single Wire Protocol (SWP) interface, disabling a Near Field Communication (NFC) function.

2. The method as claimed in claim 1, wherein said terminal determines that said user card does not support said SWP interface through interface support information provided by said user card or a stored SWP interface flag.

3. The method as claimed in claim 2, wherein after disabling the NFC function, the method further comprises:
   when said terminal is required to start a NFC application in a non card emulation mode and determines that said NFC function is in a disabled state, enabling said NFC function, and said terminal switching to a corresponding working mode according to said non card emulation mode and carrying out the NFC.

4. The method as claimed in claim 1, wherein the step of disabling the NFC function is implemented by disabling a NFC emulation front end chip.

5. The method as claimed in claim 4, wherein after disabling the NFC function, the method further comprises:
when said terminal is required to start a NFC application in a non card emulation mode and determines that said NFC function is in a disabled state, enabling said NFC function, and said terminal switching to a corresponding working mode according to said non card emulation mode and carrying out the NFC.

6. The method as claimed in claim 1, wherein before the step of disabling the NFC function, the method further comprises: said terminal inquiring a current state of said NFC function.

7. The method as claimed in claim 6, wherein after disabling the NFC function, the method further comprises:
when said terminal is required to start a NFC application in a non card emulation mode and determines that said NFC function is in a disabled state, enabling said NFC function, and said terminal switching to a corresponding working mode according to said non card emulation mode and carrying out the NFC.

8. The method as claimed in claim 1, wherein
before the step of disabling the NFC function, the method further comprises: said terminal determining that a user confirms the disabling through a human machine interaction interface; and/or
after the step of disabling the NFC function, the method further comprises: said terminal displaying a current state of said NFC function to the user in a form of text or icon on a screen.

9. The method as claimed in claim 8, wherein after disabling the NFC function, the method further comprises:
when said terminal is required to start a NFC application in a non card emulation mode and determines that said NFC function is in a disabled state, enabling said NFC function, and said terminal switching to a corresponding working mode according to said non card emulation mode and carrying out the NFC.

10. The method as claimed in claim 1, wherein after disabling the NFC function, the method further comprises:
when said terminal is required to start a NFC application in a non card emulation mode and determines that said NFC function is in a disabled state, enabling said NFC function, and said terminal switching to a corresponding working mode according to said non card emulation mode and carrying out the NFC.

11. The method as claimed in claim 10, wherein after the NFC ends, the method further comprises: disabling said NFC function.

12. A processing method in a terminal supporting enhanced Near Field Communication (eNFC), comprising:
when the terminal is required to start a NFC application in a non card emulation mode, determining that a user card does not support a Single Wire Protocol (SWP) interface and a Near Field Communication (NFC) function is in a disabled state, and enabling the NFC function.

13. The method as claimed in claim 12, wherein
before said terminal starts the NFC application in the non card emulation mode, said method further comprises: said terminal determining whether a user card supports a Single Wire Protocol (SWP) interface; further, said terminal determines whether the user card supports the SWP interface through interface support information provided by said user card or a stored SWP interface flag.

14. The method as claimed in claim 12, wherein said step of enabling the NFC function is implemented by enabling a NFC emulation front end chip.

15. The method as claimed in claim 12, wherein
before the step of enabling the NFC function, said method further comprises: said terminal inquiring a current state of said NFC function.

16. The method as claimed in claim 12, wherein
before the step of enabling the NFC function, said method further comprises: said terminal determining that a user confirms the enabling through a human machine interaction interface; and/or
after the step of enabling the NFC function, said method further comprises: said terminal displaying a current state of said NFC function to the user in a form of text or icon on a screen.

17. The method as claimed in claim 12, wherein after enabling the NFC function, said method further comprises: said terminal switching to a corresponding working state according to said non card emulation mode, and carrying out the NFC.

18. The method as claimed in claim 17, wherein after the NFC ends, said method further comprises: when said terminal determines that a user card does not support a Single Wire Protocol (SWP) interface, disabling the NFC function.

19. A terminal supporting enhanced Near Field Communication (eNFC), comprising a Near Field Communication (NFC) control unit and a NFC emulation front end chip, wherein
said NFC control unit is configured to instruct the NFC emulation front end chip to be disabled when determining that a user card does not support a Single Wire Protocol (SWP) interface;
said NFC emulation front end chip is configured to disable a NFC function according to the instruction of said NFC control unit.

20. The terminal as claimed in claim 19, wherein
said NFC control unit is further configured to send a NFC state inquiry instruction to said NFC emulation front end chip;
said NFC emulation front end chip is further configured to return a current working state thereof to said NFC control unit according to said NFC state inquiry instruction.

21. The terminal as claimed in claim 20, wherein when a NFC application in a non card emulation mode is run,
said NFC control unit is configured to instruct said NFC emulation front end chip to be enabled when determining that said NFC emulation front end chip is in a disabled state;
said NFC emulation front end chip is configured to enable said NFC function according to the instruction of said NFC control unit.

22. The terminal as claimed in claim 19, wherein when a NFC application in a non card emulation mode is run,
said NFC control unit is configured to instruct said NFC emulation front end chip to be enabled when determining that said NFC emulation front end chip is in a disabled state;
said NFC emulation front end chip is configured to enable said NFC function according to the instruction of said NFC control unit.

23. A terminal supporting enhanced Near Field Communication (eNFC), comprising a Near Field Communication (NFC) control unit and a NFC emulation front end chip,
- said NFC control unit is configured to, when said NFC emulation front end chip disables a NFC function and runs a NFC application a non card emulation mode, instruct said NFC emulation front end chip to be enabled when determining that a user card does not support a Single Wire Protocol (SWP) interface and said NFC emulation front end chip is in a disabled state;
- said NFC emulation front end chip is configured to enable the NFC function according to the instruction of said NFC control unit.

24. The terminal as claimed in claim 23, wherein
- said NFC control unit is further configured to send a NFC state inquiry instruction to said NFC emulation front end chip;
- said NFC emulation front end chip is further configured to return a current working state thereof to said NFC control unit according to said NFC state inquiry instruction.

* * * * *

UNITED STATES PATENT AND TRADEMARK OFFICE
CERTIFICATE OF CORRECTION

PATENT NO. : 8,532,704 B2
APPLICATION NO. : 13/201269
DATED : September 10, 2013
INVENTOR(S) : Ma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 10 days.

Signed and Sealed this

Fifteenth Day of September, 2015

Michelle K. Lee
*Director of the United States Patent and Trademark Office*